US007747489B2

(12) United States Patent
Perg et al.

(10) Patent No.: US 7,747,489 B2
(45) Date of Patent: Jun. 29, 2010

(54) COMPUTER-AIDED PROCESS FOR REAL PURCHASING POWER FINANCIAL PRODUCT

(75) Inventors: Wayne F. Perg, Sierra Vista, AZ (US); T. Brian Gidley, Tower Lakes, IL (US); Anthony F. Herbst, El Paso, TX (US); Hope Farr, Navato, CA (US)

(73) Assignee: New Market Solutions, LLC, Sierra Vista, AZ (US)

( * ) Notice: Subject to any disclaimer, the term of this patent is extended or adjusted under 35 U.S.C. 154(b) by 1475 days.

(21) Appl. No.: 10/957,399

(22) Filed: Oct. 1, 2004

(65) Prior Publication Data
US 2005/0144103 A1 Jun. 30, 2005

Related U.S. Application Data

(60) Provisional application No. 60/509,129, filed on Oct. 6, 2003.

(51) Int. Cl.
G06Q 40/00 (2006.01)
(52) U.S. Cl. .................... 705/35; 705/36 R; 705/36 T
(58) Field of Classification Search ............ 705/35, 705/37, 40, 1, 38, 39, 36 T, 4, 36 R, 7
See application file for complete search history.

(56) References Cited

U.S. PATENT DOCUMENTS 4,283,769 A * 8/1981 Asada ................. 708/173

| | | | |
|---|---|---|---|
| 5,237,500 A | 8/1993 | Perg et al. | |
| 5,809,043 A | 9/1998 | Hassan et al. | |
| 5,915,209 A | 6/1999 | Lawrence | |
| 6,029,146 A | 2/2000 | Hawkins et al. | |
| 6,411,939 B1 * | 6/2002 | Parsons | 705/35 |
| 6,460,021 B1 * | 10/2002 | Kirksey | 705/35 |

OTHER PUBLICATIONS

May, Gregory, Using Synthetic Investments, Jun. 1997, International Tax Review v8n6 pp. 23-29.*
Novomestky, Frederick, A Dynamic, Globally Diversified, Index Neutral Synthetic Asset Allocation Strategy, Management Science; Jul. 1997; 43, 7; ABI/INFORM Global, p. 998.*
Hill, Joanne M. & Naviwala, Humza, Synthetic and Enhanced Index Strategies using Futures on U.S. Indexes. (Special Theme: Derivatives and Risk Management), May 1999, Journal of Portfolio Management, pp. 61-74.*
Herbst, Anthony F. and Nicholas O. Ordway. "Stock Index Futures Contracts and Separability of Returns." The Journal of Futures Markets, vol. 4, No. 1, pp. 87-102 (1984).*

(Continued)

Primary Examiner—Kelly Campen
(74) Attorney, Agent, or Firm—Peter K. Trzyna, Esq.

(57) ABSTRACT

A machine and a method of using the machine to carry out specifying, with input to a computer system, a plurality of tiers and a private constant dollar instrument in at least one of a plurality of tiers; computing, from the input with computer system, aggregate cash flows for the specified tiers; determining, from the aggregate cash flows with the computer system, funding for a first of the tiers with a second of the tiers; and generating documentation of the funding with a computer system.

101 Claims, 10 Drawing Sheets

OTHER PUBLICATIONS

Herbst, Anthony F., Joseph P. McCormack, Elizabeth N. West. "Investigation of Lead-Lag Relationship between Spot Stock Indices and Their Futures Contracts." The Journal of Futures Markets, vol. 7, No. 4, pp. 373-381 (1987).*

Miller, Todd and Timothy S. Meckel. "Beating Index Funds with Derivatives." The Journal of Portfolio Management, May 1999, pp. 75-87.*

PIMCO Funds. "PMCO Stocks Plus Fund." (Aug. 19, 1999) 12 Pages, http://www.pimcofunds.com.*

McGinn, Daniel. "The Ultimate Guide to Indexing." Bloomberg, Sep. 1999, pp. 66-83.*

PCT International Search Report for PCT/US06/08108, filed Mar. 7, 2006. pp. 1-2.

PCT Written Opinion of the International Searching Authority for PCT/US06/08108, filed Mar. 7, 2006. pp. 1-4.

PCT International Search Report for PCT/US05/34387, filed Apr. 24, 2006. pp. 1-2.

PCT Written Opinion of the International Searching Authority for PCT/US05/34387, filed Apr. 24, 2006. pp. 1-3.

"United Kingdom Debt Management Office: Gilt Market", http://www.dmo.gov.uk/index.aspx?page=Gilts/Indexlinked.

"Canada Real Return Bonds," http://www.bankofcanada.ca/en/pdf/real_return_eng.pdf, Nov. 24, 1994.

"Summary of Marketable Treasury Inflation-Protected Securities" http://www.treasurydirect.gov/instit/statreg/auctreg/auctreg_gsrlist.htm.

* cited by examiner

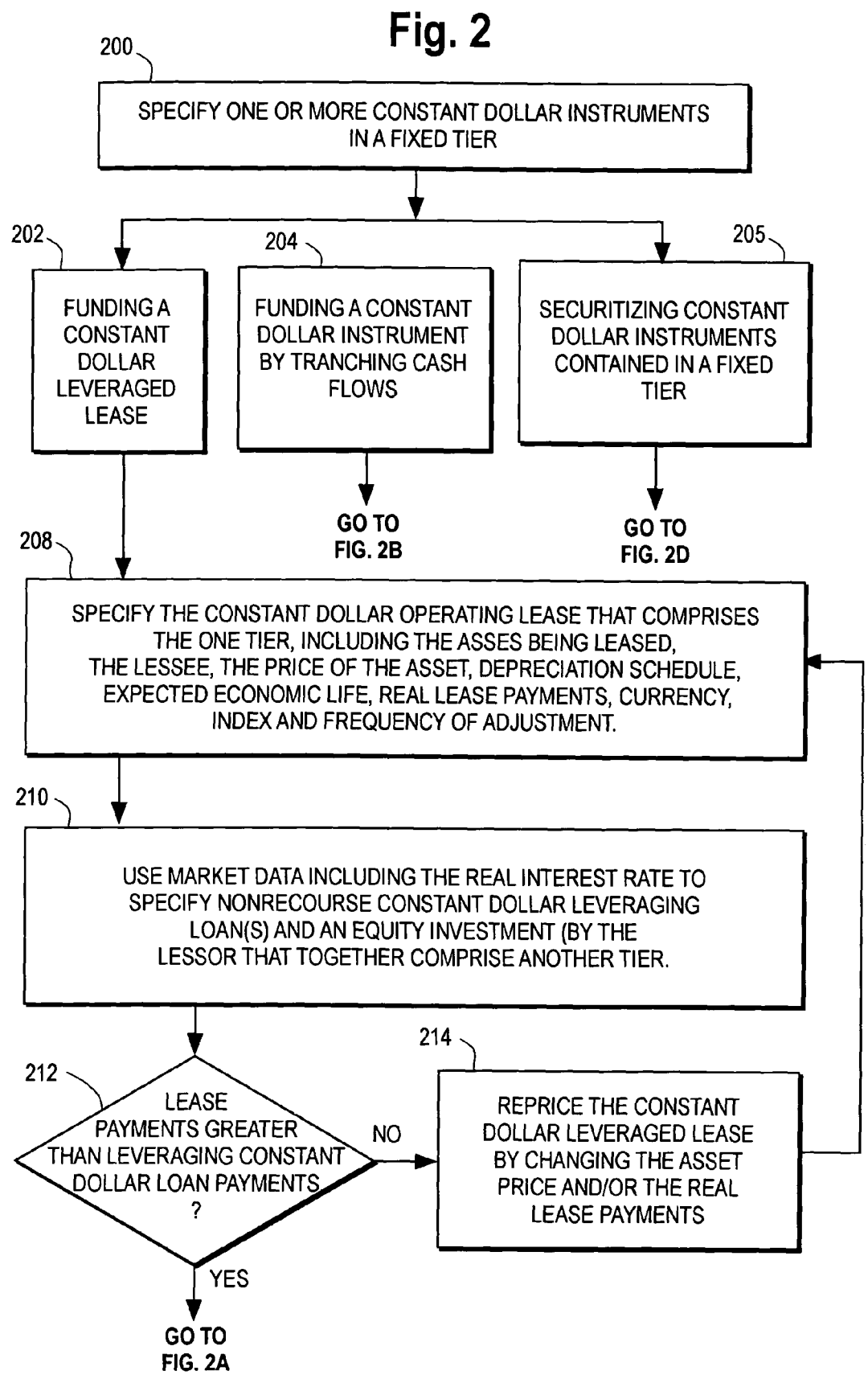

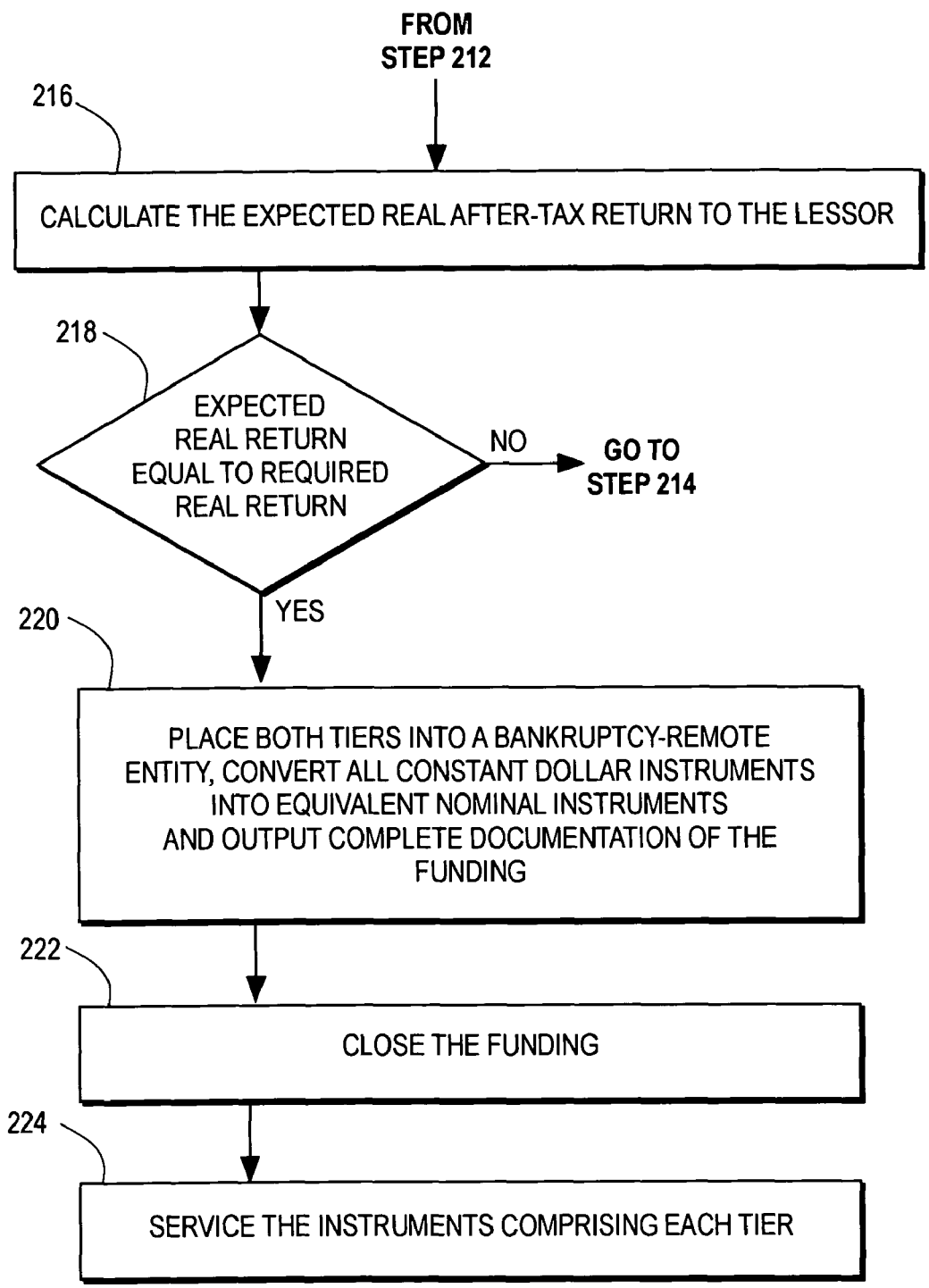

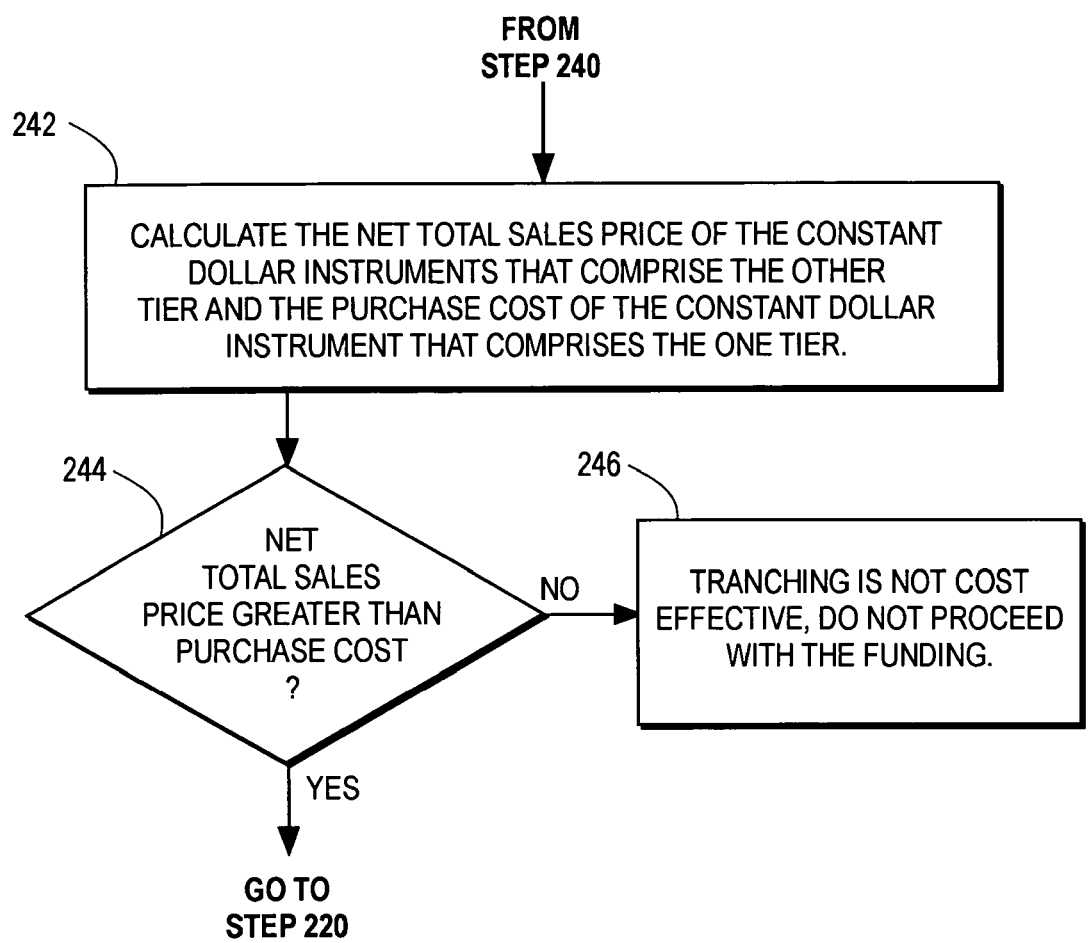

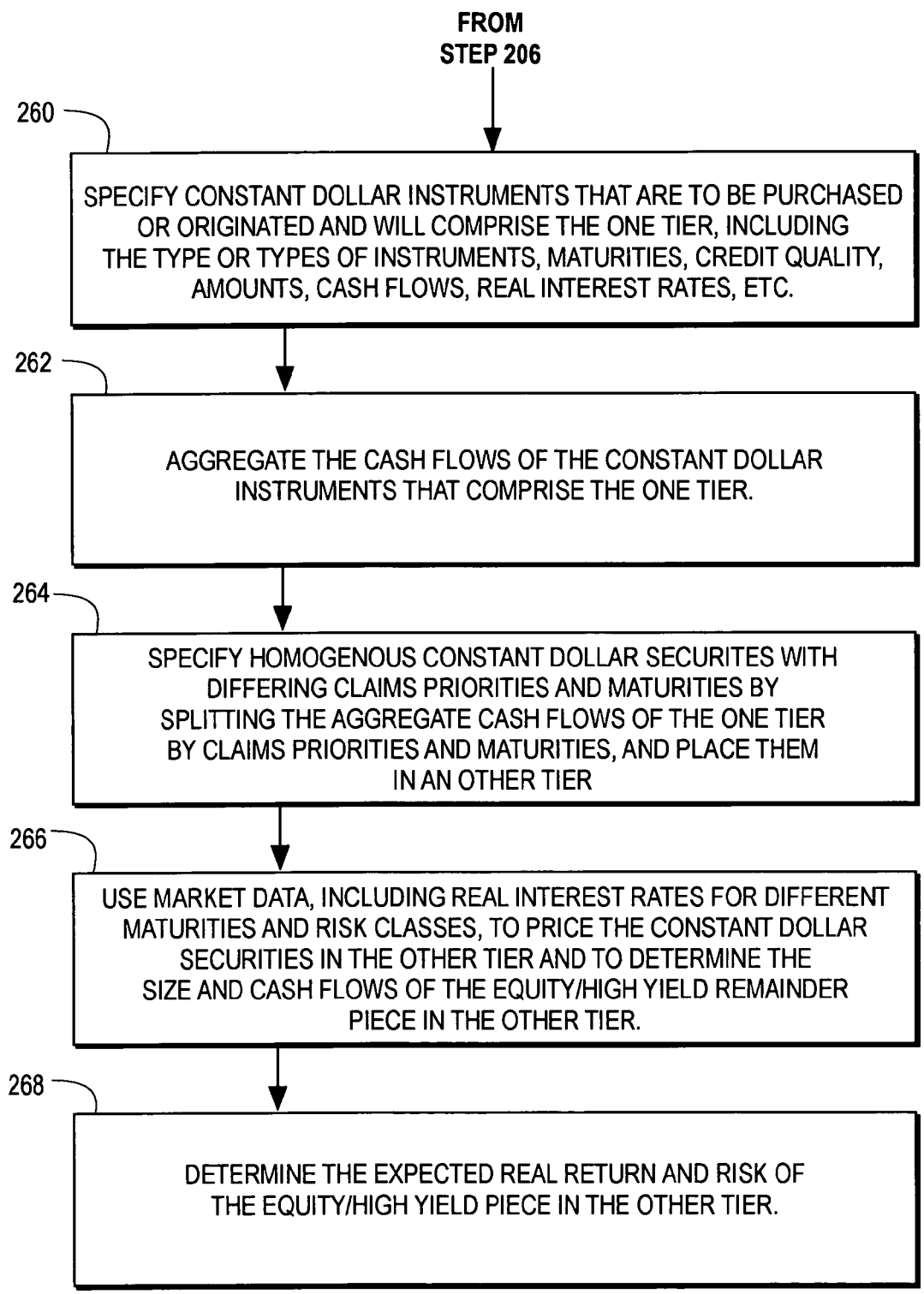

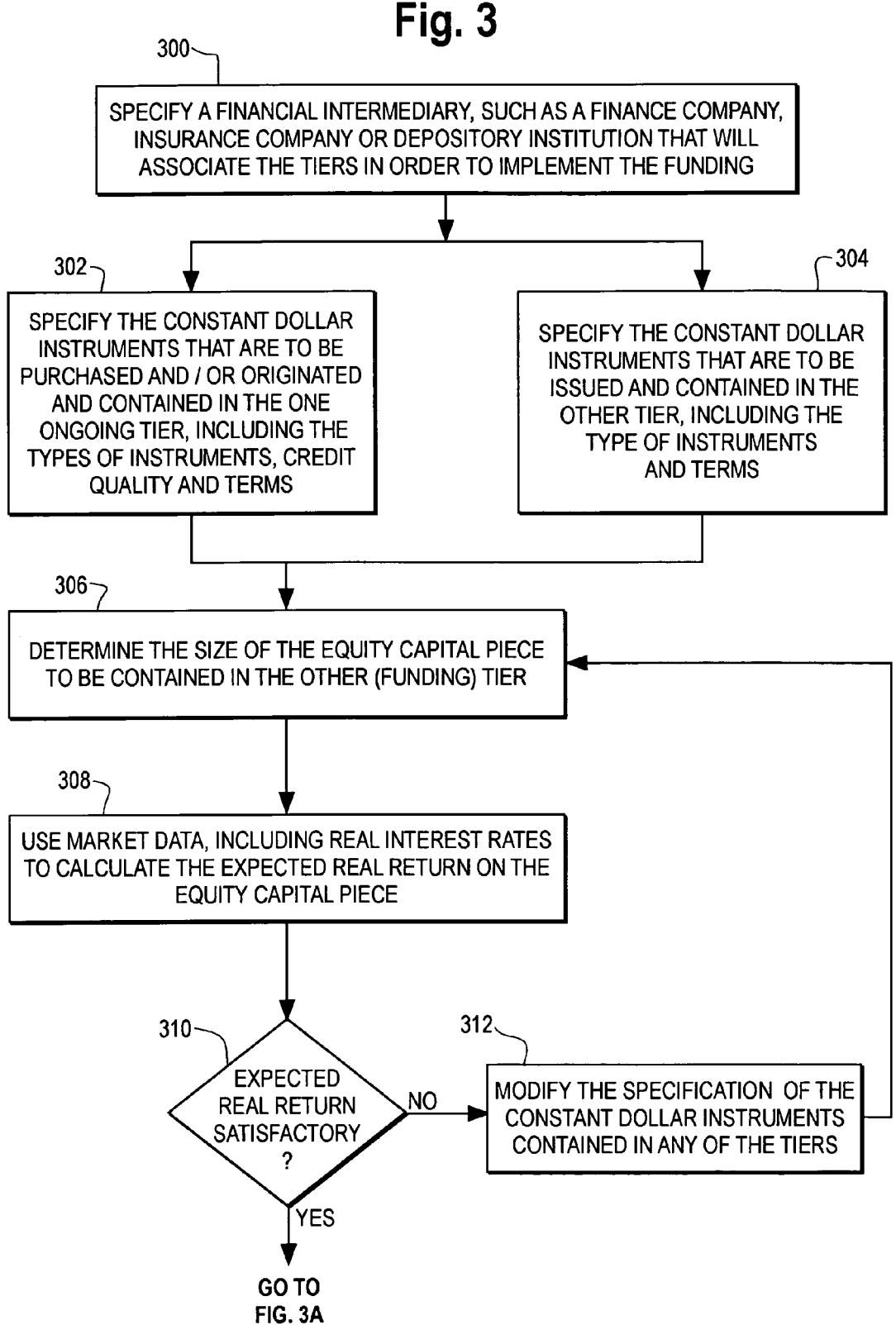

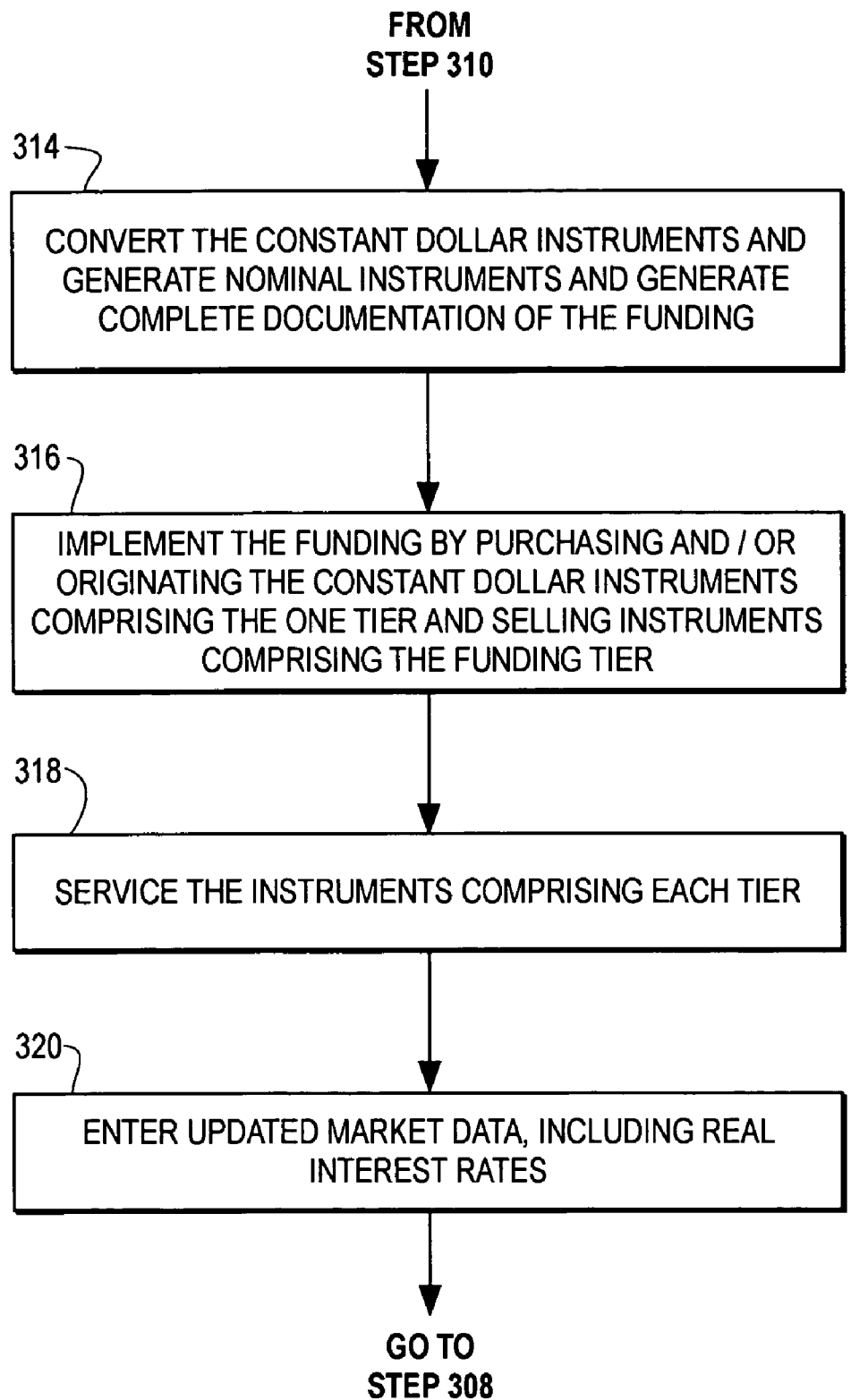

US 7,747,489 B2

COMPUTER-AIDED PROCESS FOR REAL PURCHASING POWER FINANCIAL PRODUCT

I. PRIORITY

The present patent application is a continuation-in-part of U.S. Provisional Patent titled "COMPUTER-AIDED PROCESS FOR REAL PURCHASING POWER FINANCIAL PRODUCT," Ser. No. 60/509,129, filed Oct. 6, 2003, and hereby incorporated by reference. Also incorporated by reference is U.S. patent application Ser. No. 10/885,442 tilted "MULTIPLE COMPUTER SYSTEM SUPPORTING A PRIVATE CONSTANT-DOLLAR FINANCIAL PRODUCT" filed on Express Mail number ER 182437739 as well as PCT Application of that same title, PCT/US2004/01/021933, titled "MULTIPLE COMPUTER SYSTEM SUPPORTING A PRIVATE CONSTANT-DOLLAR FINANCIAL PRODUCT," both filed Jul. 6, 2004, both naming the same inventors as those herein.

II. TECHNICAL FIELD

The technical field is computers, computer-aided methods, and data processing systems, as illustrated more particularly herein. Exemplary embodiments include, depending on the implementation, apparatus, a method for funding, and corresponding products produced thereby, as well as data structures, computer-readable media tangibly embodying program instructions, computer-generated documentation, manufactures, and necessary intermediates of the foregoing.

III. BRIEF DESCRIPTION OF THE DRAWINGS

FIG. 2 is an illustration of a flow chart for an embodiment.

FIG. 2A is an illustration of a flow chart for an embodiment.

FIG. 2C is an illustration of a flow chart for an embodiment.

FIG. 2D is an illustration of a flow chart for an embodiment.

FIG. 3 is an illustration of a flow chart for an embodiment.

FIG. 3A is an illustration of a flow chart for an embodiment.

IV. MODES

Figure 1:
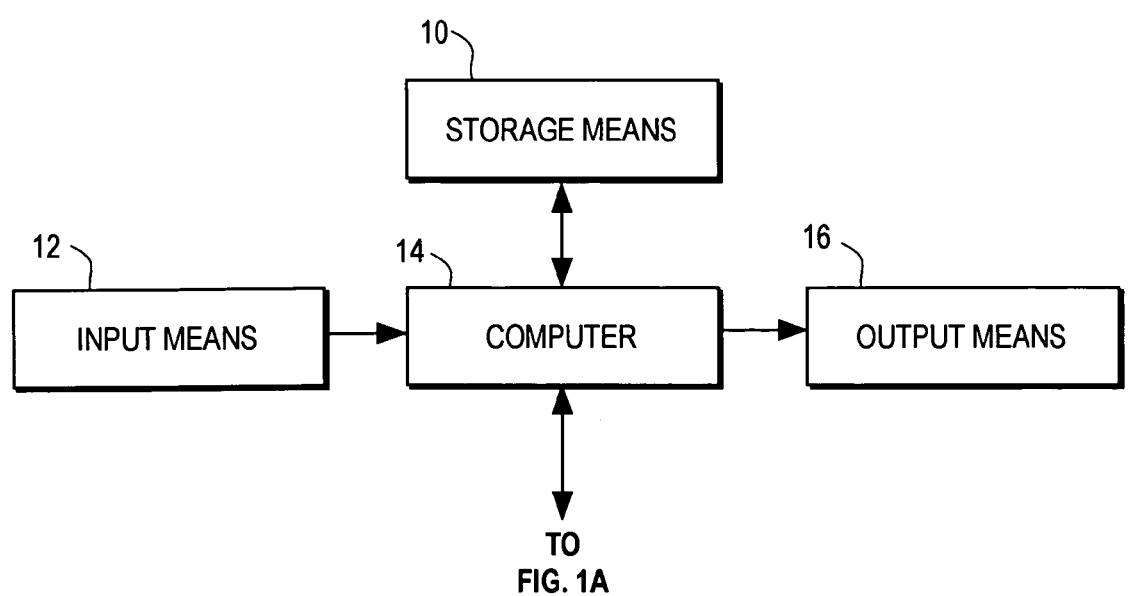
FIG. 1 is an illustration of an embodiment.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow can be implemented in discrete circuits. Computer-readable media, as used herein can comprise at least one of a RAM, a ROM, A disk, an ASIC, and a PROM. Industrial applicability is clear from the description, and is also stated below.

By way of the following prophetic teaching, there is provided computer support, as in a data processing system, for implementing funding. Said computer support for this computer-aided method of funding may be implemented by one computer system or it may be implemented by multiple computers that may be connected or networked together in an ongoing manner, intermittently, or one time. If implemented by more than one computer, the system may include at least one from a group including, but not limited to: a financial intermediary computer; a depository institution computer; a commercial bank computer; a credit union computer; an insurance company computer; a pension fund computer; a finance company computer; a leasing company computer; an investment company computer; a mutual fund computer; a real estate investment trust computer; a special purpose entity computer; a real estate mortgage investment conduit computer; a trust computer; a limited liability company computer; a partnership computer; a corporation computer; a servicing computer; a reporting computer; a broker computer; a trading computer; a clearing computer; a rating agency computer; an investment banker computer; a mortgage banker computer; a user of funds computer; a supplier of funds computer; and an other computer.

A servicing computer may be any computer that is servicing any financial instrument in any of the plurality of tiers of instruments. A broker computer may be the computer of a mortgage broker, a securities broker, a broker/dealer, and/or a broker's broker. Other computers that might be connected at some time and thus participate in the computer-aided method of funding include, but are not limited to: a business computer, a nonfinancial corporation computer, a financial institution computer, a consumer computer, a household computer, a student computer, an educational institution computer, a religious institution computer, a charitable institution computer, an academic computer, a researcher computer, a foreign investment-creating computer, a foreign servicing computer, a foreign investment banker computer, a foreign mortgage banker computer, a foreign trading computer, a foreign broker computer, a foreign rating agency computer, a foreign reporting computer, a foreign investment manager computer, a foreign investment advisor computer, a foreign bank computer, a foreign insurance computer, a foreign pension fund computer, a foreign clearing computer, a foreign investor computer, a foreign accounting computer, a foreign issuer computer, a foreign financing company computer, a foreign leasing company computer, a foreign business computer, a foreign nonfinancial corporation computer, a foreign financial institution computer, a foreign business computer, a foreign consumer computer, a foreign household computer, a foreign student computer, a foreign educational institution computer, a foreign religious institution computer, a foreign charitable institution computer, a foreign academic computer, and/or a foreign researcher computer.

If the computer-aided method of funding does involve more than one computer, the computers that may be part of the computer system may connect into the system on a continuing basis, intermittently, or on a one-time basis. Any computer that may be involved, regardless of whether one or more is involved, may be in any form or combination, including, but not limited to: a mainframe computer and terminal(s) configuration, a client/server computer configuration, a configuration comprised of a personal computer, a desk-top computer, a lap-top computer, a pocket computer, a palm computer, a personal digital assistant, a digital cell phone or other portable device, but other ways of thinking, embodiments can extend to comprising a Wi-Fi node, an embedded processor, a car or other vehicle computer, a light-wave computer, a biological or hybrid computer, a quantum computer, etc.

If more than one computer is involved, the computers may be connected, or not connected, in any pattern. The connections need not be continuously maintained; they may be intermittent, one-time or ongoing. One or more of these connections may involve the use of the Internet, an intranet, e-mail, instant messaging, text messaging, voice mail, a local area network (LAN), a wide area network (WAN), a twisted pair of copper wires, a coaxial cable, a cellular network, Wi-Fi, wide area Wi-Fi, a Wi-Fi network, a light-wave transmission, infrared, and/or a wireless connection. One of more of the connections may involve one-way communication only. One or more may involve two-way communication. Real time communications are another possibility.

More than one of any variety of computer may be involved in the computer-aided method of funding. For example, there may be more than one user of funds computer, more than one supplier of funds computer, more than one broker computer, etc.

Private constant-dollar financial instruments can be financing instruments issued by (i.e., they are liabilities of or interests in) funds users who are subject to default risk, including (but not limited to): individuals, households, for-profit businesses, corporations, partnerships, limited partnerships, sole proprietorships, financial intermediaries, depository institutions, banks, credit unions, thrifts, savings and loans, savings banks, insurance companies, investment companies, real estate investment trusts (REITS), limited-liability companies, not-for-profit businesses, nongovernmental organizations, trusts, real estate mortgage investment conduits (REMICS), other pass-through entities, municipal governments (state and local governments), agencies of municipal governments, school districts, water districts, transportation districts, other special purpose districts, and federally sponsored enterprises (e.g., Federal National Mortgage Association, Federal Home Loan Mortgage Corporation, etc.). The issuers of private constant-dollar financial instruments may be domiciled in the U.S. or in other countries.

Unlike the federal government, the issuers of private constant-dollar financial instruments do not have the power to print money. Therefore, unlike securities issued by the national or federal government, private constant-dollar financial instruments are subject to default risk and this default risk may be reduced by matching the payments promised by the instruments to the expected future revenues of the issuer. The fixed real (purchasing power) payments of the private constant-dollar financial instruments can be tailored to produce a reasonable, or even the best possible, match between promised real payment amounts and the expected future real revenues of the issuer, thus reducing the default risk relative to alternative instruments which do not have fixed real payments and cannot, therefore, be tailored to produce a reasonable, or even the best possible, match between promised payments and expected future real revenues.

Note that the use of the U.S. government is illustrative, as the concept applies equally well to other governments that have the power to print money.

Constant-dollar financial instruments are financial instruments whose terms (e.g., payment amounts, rate of return or interest rate, schedule of remaining principal balances, etc.) can be specified in units of constant purchasing power, such as dollars that have been adjusted using an index such as a price index (for example, one of the variations of the Consumer Price Index) so as to maintain constant purchasing power. However, the term "constant-dollar financial instrument" can apply to financial instruments whose terms are specified in units that are held constant in purchasing power and/or are adjusted through the application of some suitable index.

The units that are held constant in purchasing power and/or are adjusted by an index may be any currency (not just dollars) and they may be held constant and/or adjusted by any desired price index or other economic index. Said currency may be any national currency (e.g., U.S. dollars, Canadian dollars, Australian dollars, Mexican pesos, British pounds, Swiss francs, euros, yen, rubles, zlotys, Danish kroner, etc.) or any other variety of currency including private and/or local currencies. Possible varieties of said price or other index may include, but are not limited to: 1) a price index for the respective national economy as a whole (e.g., in the U.S., the consumer price index for all urban consumers, the gross domestic product deflator, etc.); 2) a price index for some component of the respective national economy (e.g., a health care price index, a housing price index, a commodity price index, an index made up of a single price such as the price of gold or the price of oil, an export price index, an import price index, a traded goods index, a wholesale price index, a goods price index, an electronic goods price index, a services price index, the consumer price index for a specified urban area, the consumer price index for a specified region, etc.); 3) an economic index for the respective national economy as a whole (e.g., in the U.S., the nominal gross domestic product, the real gross domestic product, productivity, nominal wages, real wages, total nominal labor compensation, total real labor compensation, etc.); and, 4) a local or regional economic index (e.g., regional nominal gross domestic product, regional real gross domestic product, regional productivity, regional nominal wages, regional real wages, etc.).

This context for the term "constant-dollar financial instrument" is applicable herein, and private constant-dollar financial instruments may be comprised of, utilize and/or be derived from one or more other private constant-dollar financial instruments, where the term "constant-dollar financial instrument" applies to instruments whose units that are held constant may be any currency adjusted by any desired price index or other economic index.

Private constant-dollar financial instruments may or may not be "private" in the sense that the data regarding the instrument or the issuer is private. Indeed, in the case of a public issue of private constant-dollar financial instruments, federal and state securities laws mandate extensive public disclosure of data regarding both the securities and the issuer of the securities.

Constant-dollar financial instruments may be converted into equivalent nominal-dollar financial instruments because payments presently are made in nominal dollars and because accounting, both for purposes of reporting and for calculating taxes, is presently carried out in terms of nominal dollars. Two processes have been invented for performing said conversion, both by an inventor of the present invention. The first is disclosed in U.S. Pat. Ser. No. 5,237,500 and the second is disclosed in U.S. patent application Ser. No. 09/283,102, U.S. Pat. No. 6,760,710 B1, both incorporated by reference herein. The U.S. patent application titled "MULTIPLE COMPUTER SYSTEM SUPPORTING A PRIVATE CONSTANT-DOLLAR FINANCIAL PRODUCT" which was filed on Jul. 6, 2004 as a continuation in part of U.S. Pat. Ser. No. 6,760,710 B1 is also incorporated by reference herein.

The present invention of a computer-aided method of funding, including a private constant-dollar financial instrument, may include the step of converting any of said private constant-dollar instruments into an equivalent nominal instrument.

The value of a private constant-dollar instrument may be impacted by a variety of factors, including but not limited to: 1) the credit quality of the instrument; 2) the real return of the instrument; 3) the frequency with which nominal currency amounts are adjusted by the index (i.e., the frequency of adjustment); 4) the index that is used to adjust the nominal currency amounts; and, 5) the underlying currency (e.g., U.S. dollars, euros, yen, pesos, etc.).

The value of a tier of financial instruments may be determined by determining the value of the instruments comprising the tier. Therefore, the present invention may include the steps of determining a value of a tier responsive to: 1) credit quality of the instruments comprising the tier; 2) the real return of the instruments comprising the tier; 3) the frequency of adjustment of the instruments comprising the tier; 4) the index (or indices if more than one index) used to adjust the nominal currency amounts of the instruments comprising the tier; and, 5) the underlying currency or currencies of the instruments comprising the tier.

Private constant-dollar financial instruments that hold purchasing power constant (by adjusting the nominal currency amounts by an agreed upon price index) are distinguished from other private financial instruments (i.e., financial instruments that are not constant-dollar instruments) by their virtual elimination of inflation risk and their ability to reduce default risk. They may also reduce interest rate risk because real interest rates are less volatile than nominal interest rates.

Examples of private constant-dollar financial instruments include, but are not limited to:

1. Constant-dollar mortgages.
2. Constant-dollar construction loans.
3. Constant-dollar residential mortgages, where the mortgage or deed of trust securing the note is a mortgage or deed of trust on a 1 to 4 family residential property.
4. A constant-dollar reverse loan, including a constant-dollar reverse mortgage which enables a consumer to tap the equity in their residence by receiving payments of constant purchasing power amounts, with the resulting constant-dollar loan being repaid through the sale of the residence at some defined point.
5. Constant-dollar commercial mortgages, where the mortgage or deed of trust securing the note is a mortgage or deed of trust on commercial property including office, retail, industrial, multi-family residential, and mobile-home properties.
6. Constant-dollar second mortgage or home-equity loans.
7. Constant-dollar second mortgage or deed-of-trust financing for commercial properties.
8. Constant-dollar personal loans.
9. Constant-dollar auto loans:
10. Constant-dollar vehicle loans.
11. Constant-dollar loans to finance consumer durables.
12. Constant-dollar leases.
13. Constant-dollar leases to finance automobiles.
14. Constant-dollar leases to finance consumer durables.
15. Constant-dollar leases to finance boats or ships.
16. Constant-dollar leases to finance business property.
17. Constant-dollar leases to finance aircraft, aircraft engines, airframes, combinations thereof, railroad rolling stock, trucks, buses, trams, trollies or lorries.
18. Constant-dollar leases to finance real property.
19. Constant-dollar leveraged-leases where the lessor finances a large portion of the purchase price of the asset with a nonrecourse constant-dollar loan that is secured by a first claim on the leased asset.
20. Constant-dollar business loans.
21. Constant-dollar term loans.
22. Constant-dollar notes.
23. Constant-dollar international lending contracts.
24. Constant-dollar bonds including bullets, serials, zero-coupon and combinations thereof.
25. Constant-dollar fully-amortizing bonds.
26. Constant-dollar partially-amortizing bonds.
27. Constant-dollar bonds or loans or loans with any desired amortization structure.
28. Constant-dollar bonds with sinking funds.
29. Constant-dollar private placement bonds.
30. Constant-dollar public issue bonds.
31. Constant-dollar medium-term notes, which are constant-dollar bonds (that can be of any maturity, in spite of the name) that are issued on a continuing basis over time rather than through the batch process of traditional underwriting.
32. Constant-dollar debentures.
33. Constant-dollar subordinated debentures.
34. Constant-dollar capital notes.
35. Constant-dollar mortgage bonds.
36. Constant-dollar equipment trust certificates.
37. Constant-dollar asset-backed securities.
38. Constant-dollar mortgage-backed securities.
39. Constant-dollar preferred stock.
40. Constant-dollar fully-amortizing preferred stock.
41. Constant-dollar limited partnership units.
42. Constant-dollar preferred-return LLC (Limited Liability Company) units.
43. Constant-dollar income bonds, where the issuing organization makes the promised real (purchasing power) payment only if it has income sufficient to make the payment. Payments that are not paid may cumulate with or without compounding (payment of interest on interest).
44. Constant-dollar deposits.
45. Constant-dollar certificates of deposit.
46. Constant-dollar Eurodollar deposits.
47. Constant-dollar currency, which is created when constant-dollar deposits are made checkable and/or transferable through electronic funds transfer means.
48. Constant-dollar insurance.
49. Constant-dollar whole life policies.
50. Constant-dollar universal life policies.
51. Constant-dollar variable life policies.
52. Constant-dollar annuities.
53. Constant-dollar fixed annuities.
54. Constant-dollar guaranteed investment contracts.
55. Constant-dollar municipal bonds.
56. Constant-dollar tax-exempt bonds.
57. Constant-dollar general obligation bonds.
58. Constant-dollar revenue bonds.
59. Constant-dollar double barrel bonds.
60. Constant-dollar instruments with variable real returns.
61. Constant-dollar instruments with caps and/or floors on the equivalent nominal returns.
62. Constant-dollar instruments with caps or restrictions on the nominal payment amounts.
63. Constant-dollar instruments with caps or restrictions on the nominal balance amounts.
64. Constant-dollar instruments convertible into other constant-dollar instruments.
65. Constant-dollar instruments that include options.

66. Constant-dollar instruments with the option to choose a different (constant purchasing power) currency—e.g., constant euros, constant yen, constant pounds, constant pesos, etc.
67. Constant-dollar instruments with the option to choose a different index—e.g., a services cost index, a commodity cost index, a gold price index, an oil price index, an energy price index, etc.
68. Constant-dollar instruments convertible into common stock.
69. Common stock convertible into constant-dollar instruments.
70. Constant-dollar instruments with warrants attached.
71. Constant-dollar instruments convertible into nominal instruments.
72. Nominal instruments convertible into constant-dollar instruments.

The user of the funds (issuer of the constant-dollar instrument) may be domiciled in U.S. and/or another country. The underlying currency may U.S. dollars, Canadian dollars, Mexican pesos, British pounds, euros, yen, Australian dollars or any other currency. The instrument may offer the investor and/or the issuer the option to choose from a list of one or more currencies and/or one or more indices.

Private constant-dollar financial instruments may also include financial instruments that are derived from one or more other private constant-dollar financial instruments. Possible examples of these additional possible private constant-dollar financial instruments include, but are not limited to:

1. Constant-dollar mutual fund shares, which are undivided interests in the net assets of an open-end investment company that invests predominantly in private constant-dollar financial instruments.
2. Constant-dollar pass-through securities, which are undivided interests in a pool of financial assets that are predominantly private constant-dollar financial instruments.
3. Constant-dollar variable annuities, which are variable annuities for which the investment portfolio for a variable annuity is made up predominantly of private constant-dollar financial instruments.
4. Constant-dollar separate accounts, which are separate accounts of an insurance company that are invested predominantly in a portfolio of private constant-dollar financial instruments.
5. Constant-dollar investment company shares, which are shares in an investment company that invests predominantly in private constant-dollar financial instruments.
6. Constant-dollar closed-end investment company shares, which are shares in a closed-end investment company that invests predominantly in private constant-dollar financial instruments.
7. Constant-dollar trusts, which are interests in trusts that invest predominantly in private constant-dollar financial instruments.
8. Constant-dollar unit investment trusts, which are unit investment trusts that invest predominantly in private constant-dollar financial instruments.
9. Constant-dollar pass-through securities issued by real estate mortgage investment conduits, which are real estate mortgage investment conduits that invest predominantly in private constant-dollar mortgages.
10. Shares in constant-dollar real estate investment trusts, which are real estate investment trusts that invest predominantly in private constant-dollar financial instruments.
11. Constant-dollar swaps, which are swaps where one or more of the payment streams involved in the swap is a payment stream of a private constant-dollar financial instrument.
12. Constant-dollar pensions, which are pensions that pay fixed purchasing power amounts.
13. Constant-dollar pension plans, which are pension plans that invest predominantly in private constant-dollar securities.
14. Constant-dollar defined benefit plans, which are defined benefit pension plans that invest predominantly in private constant-dollar financial instruments.
15. Constant-dollar defined contribution plan, which are defined contribution pension or retirement plans that invest predominantly in private constant-dollar financial instruments.
16. Constant-dollar 401(k) or 403(b) plans, which are 401(k) or 403(b) plans that invest predominantly in private constant-dollar financial instruments.
17. Constant-dollar Independent Retirement Accounts (IRAs), which are IRAs that invest predominantly in private constant-dollar financial instruments.
18. Constant-dollar Keoghs, UGMA, UTMA, Coverdell, Health Savings Accounts, college savings plans, travel expense saving account or other accounts designed or created to cover certain expenses and may include tax incentives such as the ability to invest with before tax dollars, defer taxes, eliminate taxes, etc.
19. A constant-dollar futures contract, which is a futures contract involving one or more private constant-dollar financial instruments.
20. A constant-dollar currency futures contract, which is a futures contract involving two constant-dollar currencies (e.g., constant dollars and constant euros, constant euros and constant pounds, constant dollars and constant pesos, etc.).
21. A constant-dollar forward, which is a forward contract involving one or more private constant-dollar financial instruments.
22. A constant-dollar currency forward, which is a forward contract involving two constant-dollar currencies (e.g., constant dollars and constant euros, constant euros and constant pounds, constant dollars and constant pesos, etc.).
23. A constant-dollar options contract, which is an option contract involving a private constant-dollar financial instrument, a private constant-dollar future, a private constant-dollar forward, or a private constant-dollar swap.
24. A constant-dollar derivative, which is a financial derivatives contract involving a constant-dollar financial instrument or product.

The term "tier" generally refers to a set of financial instruments. A set of financial instruments is one or more financial instruments. Said tier may be fixed (i.e., closed) or ongoing (open-ended).

A fixed, or closed, tier is defined by the fixed set of financial instruments contained in the tier. A fixed tier may be completely fixed or it may allow (or, in some cases, require) some, some part, or all of the instruments in the tier to be replaced by other instruments subject to specified qualifications, requirements, or limitations. A fixed tier may have a finite life time defined by the life of the instruments that it contains and/or the life of an other tier with which the tier is associated.

A possible example of a fixed tier is a set of constant dollar mortgage(s) held by a real estate mortgage investment conduit (REMIC). Said set may include one or more constant dollar mortgages, said constant-dollar mortgage or mortgages being private constant dollar instrument(s) that have been specified in the specifying step in the computer-aided funding process. Said specifying may include step of determining various criteria for the origination or purchase of a constant dollar mortgage, including a real return that is determined using market data that includes a market real interest rate.

This is a fixed tier as the specified set of constant dollar mortgage(s) will remain unchanged with the exception of substitutions that may be allowed or required by the agreements governing the operation of the REMIC. In a possible example, the agreements governing the REMIC may require the entity that organized the REMIC (possibly an investment banker, a mortgage banker, a commercial bank or other financial institution) to replace a constant dollar mortgage that go into default with one or more constant dollar mortgages that meet certain standards and are not in default. This tier may have a finite life equal to the life of the longest-lived constant-dollar mortgage contained in the tier.

In this possible example, a second tier in a plurality of tiers might be a tier of financial instruments that are the liabilities of the REMIC. This other tier may include constant pass-through securities, constant dollar mortgage-backed securities, an equity or high-yield piece, and/or other financial instruments.

This other tier is associated with the tier comprised of constant dollar mortgage(s) through the vehicle of the REMIC and this other tier, through this association, funds the one tier comprised of constant dollar mortgage(s). This funding of one tier by an other may involve determining, among other things, that: 1) the net sale proceeds of the other tier is sufficient to pay the costs of originating and/or purchasing the constant-dollar mortgages contained in the one tier; 2) the cash flows of the constant-dollar mortgage(s) in the one tier are not less than the cash flows of the financial instruments in the other tier; 3) the real return on the constant-dollar mortgage(s) in the one tier is not less than the real return on the instruments comprising the other tier; 3) the real returns on the instruments comprising the second tier are, when evaluated using market data including a real interest rate, consistent with their required real return given their risk; 4) the splitting, by maturity and/or priority of claims, of the aggregate cash flows of the constant dollar mortgage(s) comprising the one tier among the instruments among the instruments comprising the other tier provides the lowest real cost of funding the one tier by the other; and, 5) the real return on the equity or high-yield piece, if any, is consistent with the required return given its risk.

The process of specifying the other tier may involve associating cash flow from the one tier comprising constant dollar mortgage(s) with the other tier. This process of associating may include, in the process of specifying the instruments comprising the other tier, the step of computing aggregate cash flows of the one tier comprising constant dollar mortgage(s) to produce homogenous securities in the other tier. A possible example of this process would be to aggregate the cash flows of the one tier comprising constant dollar mortgage(s) and to divide them equally among a number of constant dollar pass-through securities comprising the other tier. These constant dollar pass-through securities comprising the other tier would be homogeneous because each would represent an undivided interest in the cash flows produced by the constant dollar mortgage(s) comprising the one tier. This homogeneity creates liquidity for the constant dollar pass-through securities, thus enabling the other tier comprised of constant dollar pass-through securities to securitize the one tier comprised on constant dollar mortgage(s).

Because each constant dollar pass-through security represents an undivided interest in the cash flows produced by the constant-dollar mortgage(s) comprising the one tier, each security would be identical in terms of risk and maturity. However, different suppliers of funds (purchasers of the financial instruments comprising the other tier being suppliers of funds) may have different preferences regarding risk and maturity. As a result, it may be possible to reduce the cost of funding the one tier comprised of constant dollar mortgage (s) with the other tier by disaggregating the homogenous securities comprising the other tier, splitting them by claims priorities and/or maturity times.

A possible example of this disaggregating homogeneous securities by splitting would be to specify constant dollar mortgage-backed securities in the other tier. A splitting by maturity times might include specifying a maturity schedule for the other tier comprised of constant dollar mortgage-backed securities. Said specifying may include associating a maturity of the constant dollar mortgage-backed securities comprising the other tier with a maturity of the constant dollar mortgage(s) comprising the one tier. A splitting by priority of claims might create a number of classes of instruments in the other tier. As a possible example: senior constant dollar mortgage-backed securities with first claim on the payments and principal of the constant dollar mortgages comprising the one tier; subordinated constant dollar mortgage-backed securities with second claim on cash flow and principal; junior subordinated constant dollar mortgage-backed securities with third claim on cash flow and principal; and an equity or high-yield piece with last claim on the cash flow and principal of the constant dollar mortgages comprising the one tier.

The funding of the one tier comprised of constant dollar mortgages by the other tier comprised of constant-dollar mortgage-backed securities transforms the liability of a user of funds into an asset of supplier of funds using said tiers. This transformation using said tiers may provide benefits to both suppliers and users of funds by: 1) creating liquidity for suppliers of funds as a result of securitization; 2) providing a variety of real return/risk choices for suppliers of funds; 3) providing a variety of real return/maturity choices for suppliers of funds; and, 4) increasing the availability of funds and reducing their cost for users of funds.

Users of funds who may benefit from the funding created by the association of said tiers may include homeowners, investors in real estate and businesses owning real estate. Suppliers of funds who may benefit from the funding may include, among others: households; investment companies; mutual funds; pension funds; depository institutions; commercial banks; credit unions, etc. To the extent that the suppliers of funds involved in the funding are financial intermediaries (investment companies; mutual funds; pension funds; depository institutions; commercial banks; credit unions, etc.), the result is to involve one or more tiers intermediate that are not within the portion of said tiers that are associated in the funding. For example, the purchase of some of the constant-dollar mortgage-backed securities by a mutual fund that invests in constant-dollar securities involves in the funding a tier of constant-dollar mutual fund shares intermediate that is not within the portion of said tiers that are associated in the funding.

Documentation of the funding may be generated by a computer, or by more than one computer. The computer system of the REMIC, or an other computer system such as the computer system of the entity that formed the REMIC (e.g., an investment banker, a mortgage banker, a commercial bank, a finance company, a credit union, etc.) may generate documentation that may include documentation for one or more private constant-dollar instruments within any of said tiers, documentation regarding the sale, purchase and/or origination of any said instruments, etc.

An other computer system may be involved in generating documentation for one or more private constant-dollar instruments in any of said tiers. A possible example is a REMIC formed by a finance company with the finance company purchasing some or all of the constant-dollar mortgages comprising the one tier from one or more mortgage bankers. The documentation for the constant-dollar mortgages may be generated by the mortgage banker(s) from which the finance company purchases the mortgages. The finance company may engage the services of an investment banker to structure the constant-dollar mortgage-backed securities comprising the other tier, underwrite the securities and market the securities. The investment banker computer may then generate the documentation for the constant-dollar mortgage-backed securities.

The present invention may include the step of servicing any of said constant-dollar instruments in any of said tiers. Said servicing may be performed by one computer or by more than one computer. In the possible example of a REMIC formed by a finance company, the servicing of a constant-dollar mortgage in the one tier may be performed by the computer of a mortgage banker, the computer of the finance company, or an other computer or computers. The servicing of the constant-dollar mortgage-backed securities in the other tier may be performed by a servicing computer operated by a commercial bank or by an other computer or computers.

It may be that all of the constant-dollar mortgages comprising the one tier are in one currency (e.g., U.S. dollars) and that the constant-dollar mortgage-backed securities comprising the other tier are in the same currency, determining a funding in only one currency.

It may be that one or more of the constant-dollar mortgages comprising the one tier are in a currency or currencies different from the currency or currencies of the constant-dollar mortgage-backed securities comprising the other tier. As a possible example, the constant-dollar mortgages comprising the one tier may be in Mexican pesos (constant-peso mortgages) or in a variety of developing country currencies and the constant-dollar mortgage-backed securities may be in U.S. dollars (or euros or some combination of developed country currencies). If more than one currency is involved in the funding, the funding may include a step of determining a value of one or more tiers responsive to currency.

The present invention includes tiers that are ongoing, or open-ended rather than fixed. In an ongoing, or open-ended, tier instruments may be added or removed over time. The size of the tier (as measured by the number of instruments, the principal amount of the instruments, etc.) may grow or shrink over time. There may or may not be restrictions, limitations, requirements, regulations, etc. which may limit, affect or otherwise determine the instruments which may be added or removed from an ongoing tier.

As a possible example, consider an ongoing tier of instruments that are assets of an insurance company. Regulators of the insurance company may put forth regulations stating that any instrument added to the tier must be rated as "investment grade" with regard to credit risk. The insurance company may have a set of requirements, guidelines, etc. that further limit or determine whether or not an instrument may be added to the tier (e.g., loan-to-value and debt coverage standards for commercial real estate loans).

In addition to an ongoing tier of instruments that are assets of the insurance company, the insurance might also have an ongoing tier of private constant-dollar financial instruments that are assets of a separate account of the insurance company. Said tier may, depending on the investment guidelines set by the insurance company, be comprised of more than one type of private constant-dollar financial instrument (e.g., constant-dollar corporate bonds, constant-dollar mortgages, constant-dollar mortgage-backed securities, constant-dollar asset-backed securities, constant-dollar preferred stock, etc.).

In this possible example, undivided interests in said separate account may comprise a tier intermediate within the portion of tiers that are associated in the funding. The tier of private constant-dollar instruments that are assets of the separate account may be funded by associating said tier with a tier of constant-dollar insurance and annuity instruments sold by the insurance company, with tier of undivided interests in said separate account intermediate within the portion of tiers associated in the funding.

In funding an ongoing tier of private constant-dollar financial instruments by associating it with an other ongoing tier comprised of constant-dollar insurance and annuity instruments, the computer of the insurance company is transforming the liability of a user of funds into an asset of a supplier of funds using said tiers.

As another possible example of funding involving the association of ongoing tiers, consider a finance company. The one ongoing tier, comprised of instruments that are assets of the finance company, may (depending on the investment guidelines of the finance company) include, but not be limited to, some combination of:

1. Constant-dollar mortgages.
2. Constant-dollar construction loans.
3. Constant-dollar residential mortgages, where the mortgage or deed of trust securing the note is a mortgage or deed of trust on a 1 to 4 family residential property.
4. A constant-dollar reverse loan, especially a constant-dollar reverse mortgage which enables a consumer to tap the equity in their residence by receiving payments of constant purchasing power amounts, with the resulting constant-dollar loan being repaid through the sale of the residence at some defined point.
5. Constant-dollar commercial mortgages, where the mortgage or deed of trust securing the note is a mortgage or deed of trust on commercial property including office, retail, industrial, multi-family residential, and mobile-home properties.
6. Constant-dollar second mortgage or home-equity loans.
7. Constant-dollar second mortgage or deed-of-trust financing for commercial properties.
8. Constant-dollar personal loans.
9. Constant-dollar auto loans.
10. Constant-dollar vehicle loans.
11. Constant-dollar loans to finance consumer durables.
12. Constant-dollar leases.
13. Constant-dollar leases to finance automobiles.
14. Constant-dollar leases to finance consumer durables.
15. Constant-dollar leases to finance boats or ships.
16. Constant-dollar leases to finance business property.
17. Constant-dollar leases to finance aircraft, aircraft engines, airframes, combinations thereof, railroad rolling stock, trucks, buses, trams, trollies or lorries.
18. Constant-dollar leases to real property.
19. Constant-dollar leveraged-leases where the lessor finances a large portion of the purchase price of the asset with a nonrecourse constant-dollar loan that is secured by a first claim on the leased asset.

20. Constant-dollar business loans.
21. Constant-dollar term loans.
22. Constant-dollar notes.
23. Constant-dollar international lending contracts.
24. Constant-dollar bonds.
25. Constant-dollar fully-amortizing bonds.
26. Constant-dollar private placement bonds.
27. Constant-dollar public issue bonds.
28. Constant-dollar medium-term notes, which are constant-dollar bonds (that can be of any maturity, in spite of the name) that are issued on a continuing basis over time rather than through the batch process of traditional underwriting.
29. Constant-dollar debentures.
30. Constant-dollar subordinated debentures.
31. Constant-dollar capital notes.
32. Constant-dollar mortgage bonds.
33. Constant-dollar equipment trust certificates.
34. Constant-dollar asset-backed securities.
35. Constant-dollar mortgage-backed securities.
36. Constant-dollar preferred stock.
37. Constant-dollar fully-amortizing preferred stock.
38. Constant-dollar limited partnership units.
39. Constant-dollar preferred-return LLC (Limited Liability Company) units.
40. Constant-dollar income bonds, where the issuing organization makes the promised real (purchasing power) payment only if it has income sufficient to make the payment. Payments that are not paid may cumulate with or without compounding (payment of interest on interest).

An other ongoing tier, comprised of instruments that are liabilities of the finance company, is associated with the one ongoing tier in the funding of the one ongoing tier by the other ongoing tier. The other tier may include, but not be limited to, some combination of:

1. Constant-dollar debentures.
2. Constant-dollar subordinated debentures.
3. Constant-dollar capital notes.
4. Constant-dollar asset-backed securities.
5. Constant-dollar income bonds.
6. Constant-dollar preferred stock.

In the process of funding the one ongoing tier with the other ongoing tier, the finance company may: 1) sell constant-dollar instruments comprising the other tier and then purchase and/or originate constant-dollar instruments comprising the one tier; 2) purchase and/or originate constant-dollar instruments comprising the one tier and then sell constant-dollar instruments comprising the other tier; 3) simultaneously sell constant-dollar instruments comprising the other tier and purchase and/or originate constant-dollar instruments comprising the one tier; or, 4) practice some combination of the preceding.

In funding an ongoing tier of private constant-dollar financial instruments by associating it with an other ongoing tier comprised of constant-dollar insurance and annuity instruments, the computer of the finance company is transforming the liability of a user of funds into an asset of a supplier of funds using said tiers.

FIG. 1 illustrates the simplest embodiment of the present invention, a single computer system comprised of a computer 14, an input means such as a keyboard 12, a storage means such as a disk drive 10, and an output means such as a printer 16.

Figure 1A:
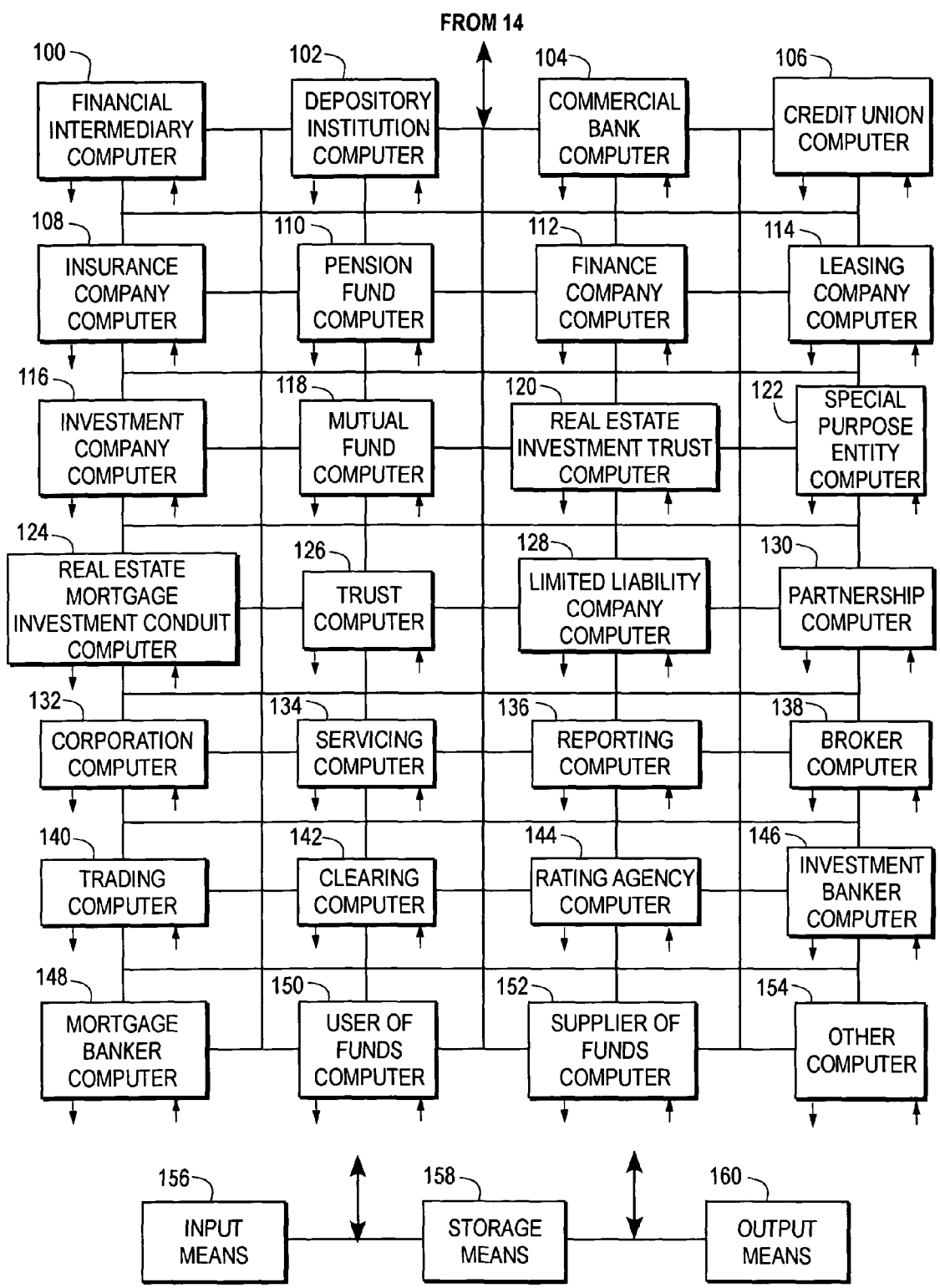
FIG. 1A is an illustration of an embodiment.
Figure 2B:
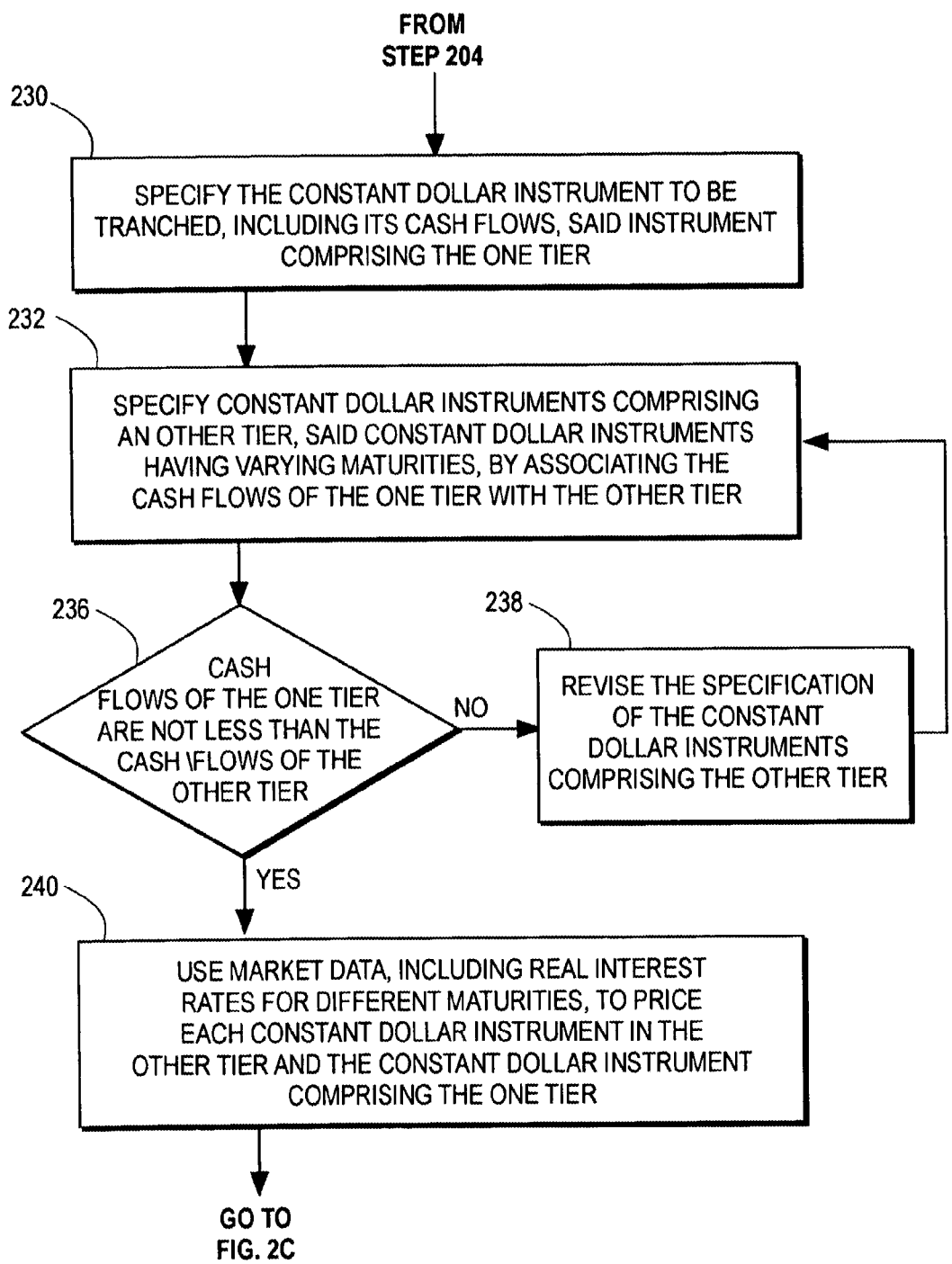
FIG. 2B is an illustration of a flow chart for an embodiment.
Figure 2E:
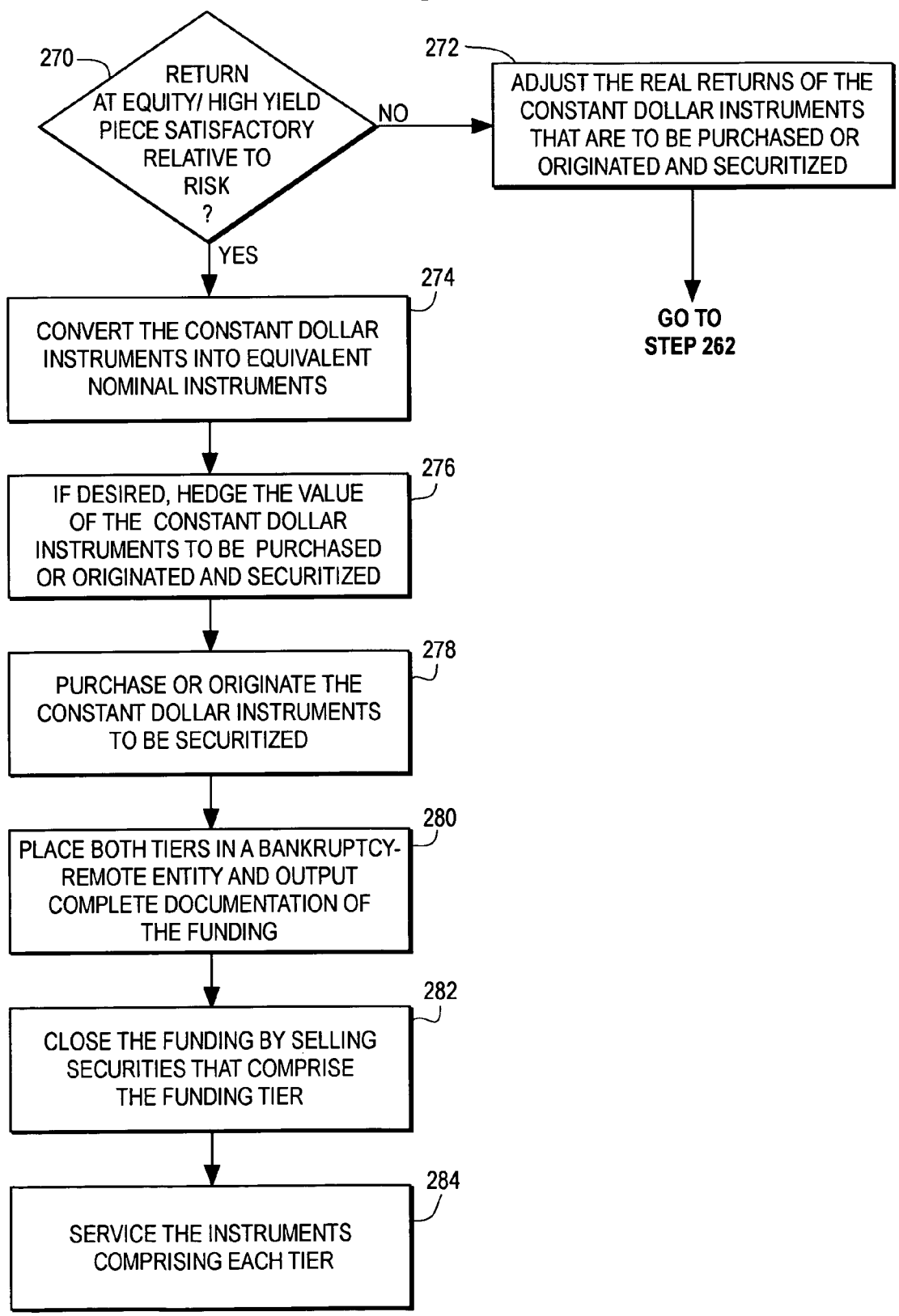
FIG. 2E is an illustration of a flow chart for an embodiment.

FIG. 1A expands the system 1 to include the possibility of more than one computer. The possible computers comprising the system 1 include, but are not limited to, any computer or combination of computers including: a financial intermediary computer 100; a depository institution computer 102; a commercial bank computer 104; a credit union computer 106; an insurance company computer 108; a pension fund computer 110; a finance company computer 112; a leasing company computer 114; an investment company computer 116; a mutual fund computer 118; a real estate investment trust computer 120; a special purpose entity computer 122; a real estate mortgage investment conduit computer 124; a trust computer 126; a limited liability company computer 128; a partnership computer 130; a corporation computer 132; a servicing computer 134; a reporting computer 136; a broker computer 138; a trading computer 140; a clearing computer 142; a rating agency computer 144; an investment banker computer 146; a mortgage banker computer 148; a user of funds computer 150; a supplier of funds computer 152; and an other computer 154.

As represented in FIG. 1A, each said computer can have a corresponding input means (156) such as a keyboard, a storage means (158) such as a disk drive, and an output means (160) such as a printer, modem, etc. !56, 158, and 160 can be viewed, in a sense, as plugging into any of the computers, as illustrated in FIG. 1A.

Any computer in the FIGS. 1 and 1A may include one or more input means (12, 156). Possible examples of said input means (12, 156) include, but are not limited to: a keyboard, a scanner, a voice recognition device, a connection with another computer and/or other digital device, etc. Any computer in the FIGS. 1 and 1A may, or may not, employ any input means (12, 156), either individually or in cooperation with another computer. Data may be input into one or more of the computers of FIGS. 1 and 1A using one or more input means (12, 156). The input into one or more of the computers of the FIGS. 1 and 1A may include one or more software programs, including, but not limited to: a software program stored on a disk, a software program stored on a memory card or stick, a software program stored on tape, a software program stored in a holographic storage device, a software program stored on a computer memory device, and/or a software program stored on another computer or other digital device.

Any computer in FIGS. 1 and 1A may include one or more storage means (10, 158). Possible examples of said storage means (10, 158) include, but are not limited to: a magnetic disk drive, an optical disk drive, a holographic disk drive, a tape drive, a memory card or stick, dynamic random access memory (dynamic RAM), static random access memory (static RAM), and/or another computer or other such device. Any computer in the FIGS. 1 and 1A may or may not employ more than one of any such storage means (10, 158).

Any computer in FIGS. 1 and 1A may include one or more output means (16, 160). Possible examples of said output means (16, 160) include, but are not limited to: a monitor, a printer, a voice synthesizer, a disk drive, a holographic disk drive, and a connection with another computer and/or other device. Any computer in FIGS. 1 and 1A may, or may not, employ any output means (16, 160), either individually or in cooperation with another computer. Data may be output from one or more of the computers in FIGS. 1 and 1A using one or more output means (16, 160). The output from one or more of the computers as in FIGS. 1 and 1A may include one or more software programs, including, but not limited to: a software program stored on a disk, a software program stored on a memory card or stick, a software program stored on tape, a software program stored on a holographic disc drive, and/or a software program transmitted to another computer or other device.

The FIGS. 2, 2A, 2B, 2C, 2D and 2E are flow charts for sample embodiments of the present invention using fixed tiers. In each case (FIG. 2) the process begins 200 by specifying one or more constant dollar instruments in a fixed tier. The examples of embodiments involving the use of fixed tiers include: constant dollar leveraged lease funding 202; funding a constant dollar instrument by tranching cash flows 204; and securitizing a tier of constant dollar instruments contained in a fixed tier 206.

In the possible example of constant dollar leveraged lease financing, the first step is to specify the constant dollar operating lease comprising the one tier, including, but not limited to: the asset being leased; the lessee; the price of the asset; the (tax) depreciation schedule; the expected economic life of the asset; a real lease rate; a currency; an index; and a frequency of adjustment 208.

The asset being leasing may be an infrastructure asset such as a gas pipeline, a power plant, a railroad line, etc. An ability of constant dollar leveraged lease financing that may be advantageous in infrastructure finance is that the lessee can use constant dollar leveraged lease financing to unlock the value of capital-intensive infrastructure assets and continue to control the assets and profit from their use for as long as the lessee continues to make the fixed real lease payments.

The next step is to use market data, including a real interest rate, to specify the instruments comprising the other tier, including a nonrecourse constant dollar leveraging loan or loans and an equity investment by a lessor 210. The nonrecourse leveraging loan or loans may be in the same currency as the constant-dollar leveraged lease or in a different currency. There may be more than one nonrecourse constant dollar leveraging loan in one or more than one currency.

Then the system 1 determines whether the constant dollar lease payments are greater than the leveraging constant dollar loan payments 212. If the answer is no, the constant-dollar lease is repriced by changing the price of the asset and/or the real lease payments 214 and the system 1 returns to step 208. If the answer is yes, the system 1 (FIG. 2A) calculates the expected real, after-tax return to the lessor 216.

Next, the system 1 determines 218 whether or not the expected real return to the lessor is equal to the required real return. If the answer is no, the system 1 returns to step 214, repricing the constant dollar lease.

If the answer is yes, both tiers are placed into a bankruptcy-remote entity (a special purpose entity), the constant dollar instruments are converted into equivalent nominal instruments, and complete documentation of the funding is prepared by computer and outputted 220.

The final two steps are to close the funding 222 and service the instruments comprising each tier 224.

In the example of funding a constant dollar instrument by tranching cash flows 204, the first step (FIG. 2B) is to specify the constant dollar instrument that is to be tranched, which comprises the one tier, including the real cash flows, currency, index and frequency of adjustment 230.

The next step is to specify constant dollar instruments comprising an other tier, said constant dollar instruments having varying maturities, by associating the cash flows of the one tier with the other tier 232.

The system 1 then determines if the cash flows of the one tier are not less than the cash flows of the other tier 236. If the answer is no, the system 1 revises the specification of the constant dollar instruments comprising the other tier 238 by revisiting the step of associating the cash flows of the one tier with the other 232. If the answer is yes, the system 1 uses market data, including real interest rates for different maturities, to price each constant dollar instrument in the other tier and the constant dollar instrument comprising the one tier 240.

The system 1 then (FIG. 2C) then calculates the net total sales price of the constant dollar instruments that comprise the other tier and the purchase cost of the constant dollar instrument that comprises the one tier 242.

The next step is determine if the net total sales price is greater than the purchase cost 244. The purchase cost may include charges for time and resources expended by investment banker or other entity performing the funding.

If the answer is no, the tranching is not a cost effective and the funding does not proceed 246. If the answer is no, the system 1 proceeds to step 220.

In the example of securitizing constant dollar instruments contained in a fixed tier 206, the first step (FIG. 2D) is to specify constant dollar instruments that are to be purchased or originated and will comprise the one tier, including the type or types of instruments, maturities, credit quality, amounts, cash flows, real interest rate, etc. 260.

The system 1 then aggregates the cash flows of the constant dollar instruments that comprise the one tier 262. The next step is to specify homogeneous constant dollar securities with differing claims priorities and maturities by splitting the aggregate cash flows of the one tier by claims priorities and maturities, and place these constant dollar securities in an other tier 264.

The next step is to use market data, including real interest rates for different maturities and risk classes, to price the constant dollar securities in the other tier and to determine the size and cash flows of the equity/high yield remainder piece in the other tier 266.

The system 1 then determines the expected real return and risk of the equity/high yield piece in the other tier 268. The next step is to determine whether the return on the equity/high yield piece is satisfactory relative to risk 270. If the answer is no, then the system 1 adjusts the real returns of the constant dollar instruments that are to be purchased or originated 272 and the system 1 returns to step 262. If the answer is yes, the system 1 converts the constant dollar instruments to equivalent nominal instruments 274. If desired, the value of the constant dollar instruments to be purchased or securitized may be hedged 276.

The final steps are to purchase or originate the constant dollar instruments to be securitized 278; place both tiers in a bankruptcy-remote entity (a special purpose entity) and output complete documentation of the funding 280; close the funding by selling securities that comprise the other (funding) tier 282; and service the instruments comprising each tier 284.

The FIGS. 3 and 3A are flow charts for a sample embodiment of the invention using ongoing tiers.

The first step (FIG. 3) is to specify a financial intermediary, such as a finance company, insurance company or depository institution that will associate the ongoing tiers to implement the funding 300.

The next step is to jointly specify: 1) the constant dollar instruments that are to be purchased and/or originated and contained in the one ongoing tier, including the types of instruments, credit quality and terms 302; and, 2) the constant dollar instrument that are to be issued and contained in the other tier, including the type of instruments and terms 304.

Then the system 1 determines the size of the equity capital piece to be contained in the other (funding) tier 306. Next, the system 1 uses market data, including real interest rates, to calculate the expected real return on the equity capital piece 308.

The next step is to determine if the expected real return on the equity piece is satisfactory 310. If the answer is no, modify the specifications of the constant dollar instruments contained in any of the tiers 312 and proceed to step 306. If the yes, the system 1 (FIG. 3A) converts the constant dollar instruments into equivalent nominal instruments and generates complete documentation of the funding 314. The financial intermediary then implements the funding by purchasing and/or originating the constant dollar instruments comprising the one tier and selling instruments comprising the other (funding) tier 316.

The system 1 services the instruments comprising each tier 318. Updated market data, including real interest rates 320 and the system 1 proceeds to step 308 creating an ongoing cycle.

We claim:

1. A computer-aided method of funding, the method including the steps of:
    specifying, with input to a computer system, a plurality of tiers and a private constant dollar instrument in at least one of the plurality of tiers;
    computing, from the input with the computer system, aggregate cash flows for the specified tiers;
    determining, from the aggregate cash flows with the computer system, funding for a first of the tiers with a second of the tiers;
and
    generating documentation of the funding with the computer system.

2. The method of claim 1, wherein the private constant dollar instrument is in the first of the tiers.

3. The method of claim 1, wherein the private constant dollar instrument is in the second of the tiers.

4. The method of claim 1, wherein one said constant dollar instrument is in the first of the tiers and an other said constant dollar instrument is in the second of the tiers, said constant dollar instruments being the private constant dollar instrument.

5. The method of claim 4, wherein the step of specifying is carried out with a tier intermediate the first of the tiers and the second of the tiers, the intermediate tier within the plurality.

6. The method of claim 4, wherein the step of specifying is carried out with a tier intermediate the first of the tiers and the second of the tiers, the intermediate tier not within the plurality.

7. The method of claim 4, wherein the step of determining funding includes determining a value of any of the tiers responsive to an index.

8. The method of claim 4, wherein the step of determining funding includes determining a value of any of the tiers responsive to a frequency of adjustment.

9. The method of claim 4, wherein the step of determining funding includes determining funding for only one currency for the tiers.

10. The method of claim 4, wherein the step of determining the funding includes determining a value of any of the tiers responsive to currency.

11. The method of claim 4, wherein the private constant-dollar financial instrument includes a financial instrument derived from one or more other private constant-dollar financial instruments.

12. The method of claim 4, wherein the step of specifying includes specifying a claim priority on the cash flow for any of the tiers.

13. The method of claim 4, wherein the step of specifying includes specifying a maturity schedule for any of the tiers.

14. The method of claim 4, wherein the step of determining includes determining that cash flow of the first of the tiers is not less than cash flow of the second of the tiers.

15. The method of claim 4, further including associating a maturity of any of said constant dollar instruments in any of the tiers with a maturity of any other of said constant dollar instruments in any other of the tiers.

16. The method of any one of claims 4-15, wherein the step of determining includes determining that a real interest rate of the first of the tiers is not less than a real interest rate of the second of the tiers.

17. The method of claim 16, further including the step of converting any of said constant dollar instruments into an equivalent nominal dollar instrument.

18. The method of claim 4, wherein the step of determining includes using any of the tiers to securitize any other of the tiers.

19. The method of claim 4, wherein the step of determining is carried out by a financial intermediary computer using said tiers in transforming liability of a user of funds into an asset of a supplier of funds.

20. The method of claim 4, wherein the step of determining is carried out by a depository institution computer using said tiers in transforming liability of a user of funds into an asset of a supplier of funds.

21. The method of claim 4, wherein the step of determining is carried out by a commercial bank computer using said tiers in transforming liability of a user of funds into an asset of a supplier of funds.

22. The method of claim 4, wherein the step of determining is carried out by an insurance company computer using said tiers in transforming liability of a user of funds into an asset of a supplier of funds.

23. The method of claim 4, wherein the step of determining is carried out by a pension fund computer using said tiers in transforming liability of a user of funds into an asset of a supplier of funds.

24. The method of claim 4, wherein the step of determining is carried out by a credit union computer using said tiers in transforming liability of a user of funds into an asset of a supplier of funds.

25. The method of claim 4, wherein the step of determining is carried out by a finance company computer using said tiers in transforming liability of a user of funds into an asset of a supplier of funds.

26. The method of claim 4, wherein the step of determining is carried out by a leasing company computer using said tiers in transforming liability of a user of funds into an asset of a supplier of funds.

27. The method of claim 4, wherein the step of determining is carried out by an investment company computer using said tiers in transforming liability of a user of funds into an asset of a supplier of funds.

28. The method of claim 4, wherein the step of determining is carried out by a mutual fund computer using said tiers in transforming liability of a user of funds into an asset of a supplier of funds.

29. The method of claim 4, wherein the step of determining is carried out by a special purpose entity computer using said tiers in transforming liability of a user of funds into an asset of a supplier of funds.

30. The method of claim 4, wherein the step of determining is carried out by a real estate mortgage investment conduit computer using said tiers in transforming liability of a user of funds into an asset of a supplier of funds.

31. The method of claim 4, wherein the step of determining is carried out by a trust computer using said tiers in transforming liability of a user of funds into an asset of a supplier of funds.

32. The method of claim 4, wherein the step of determining is carried out by a limited liability company computer using said tiers in transforming liability of a user of funds into an asset of a supplier of funds.

33. The method of claim 4, wherein the step of determining is carried out by a partnership computer using said tiers in transforming liability of a user of funds into an asset of a supplier of funds.

34. The method of claim 4, wherein the step of determining is carried out by a corporation computer using said tiers in transforming liability of a user of funds into an asset of a supplier of funds.

35. The method of claim 4, wherein the step of determining is carried out by a real estate investment trust computer using said tiers in transforming liability of a user of funds into an asset of a supplier of funds.

36. The method of claim 4, wherein the step of specifying is carried out with the one of said constant dollar instruments comprising a constant dollar mortgage.

37. The method of claim 4, wherein the step of specifying is carried out with the one of said constant dollar instruments comprising a constant dollar mortgage-backed security.

38. The method of claim 4, wherein the step of specifying is carried out with the one of said constant dollar instruments comprising a constant dollar lease.

39. The method of claim 4, wherein the step of specifying is carried out with the one of said constant dollar instruments comprising a constant dollar loan.

40. The method of claim 4, wherein the step of specifying is carried out with the one of said constant dollar instruments comprising a constant dollar security.

41. The method of claim 4, wherein the step of specifying is carried out with any of the tiers including undivided interests in any other of the tiers.

42. The method of claim 4, wherein the step of specifying is carried out with said constant dollar instruments comprised of more than one of the group including a constant dollar mortgage-backed security, a constant dollar lease, a constant dollar loan, a constant dollar security, an undivided interests in the second of the tiers, and a constant dollar asset-backed security.

43. The method of claim 4, wherein the step of determining includes evaluating market data including a real interest rate.

44. The method of claim 4, further including the step of computing to reflect aggregation of cash flows of the first of the tiers producing homogeneous securities for an other of the tiers.

45. The method of claim 44, further including the step of computing to reflect disaggregation of the homogeneous securities including splitting of the securities by claim priority.

46. The method of claim 44, further including the step of computing to reflect disaggregation of the homogeneous securities including splitting of the securities by a maturity time.

47. The method of claim 4, further including the step of computing to reflect servicing of any of said constant dollar instruments.

48. The method of claim 4, wherein said private constant dollar instrument is in both said tiers.

49. A computer apparatus funding system, the apparatus including:

a computer system comprising at least one digital computer in communication with an input device to receive input data and an output device, wherein the at least one digital computer is controlled by a respective computer program to enable processing input electrical signals, the input electrical signals being produced in response to information entered at the input device, to produce output signals, to facilitate the computer system carrying out the steps of:

specifying, with input, a private constant dollar instrument in at least one of a plurality of tiers;

computing, from the input with the computer system, aggregate cash flows for the specified tiers;

determining, responsive to the cash flows, funding for a first of the tiers with a second of the tiers; and producing documentation of the funding.

50. The apparatus of claim 49, wherein the private constant dollar instrument is in the first of the tiers.

51. The apparatus of claim 49, wherein the private constant dollar instrument is in the second of the tiers.

52. The apparatus of claim 49, wherein one said constant dollar instrument is in the first of the tiers and an other said constant dollar instrument is in the second of the tiers, said constant dollar instruments being the private constant dollar instrument.

53. The apparatus of claim 52, wherein the step of specifying is carried out with a tier intermediate the first of the tiers and the second of the tiers, the intermediate tier within the plurality.

54. The apparatus of claim 52, wherein the step of specifying is carried out with a tier intermediate the first of the tiers and the second of the tiers, the intermediate tier not within the plurality.

55. The apparatus of claim 52, wherein the step of determining funding includes determining a value of any of the tiers responsive to an index.

56. The apparatus of claim 52, wherein the step of determining funding includes determining a value of any of the tiers responsive to a frequency of adjustment.

57. The apparatus of claim 52, wherein the step of determining funding includes determining funding for only one currency for the tiers.

58. The apparatus of claim 52, wherein the step of determining the funding includes determining a value of any of the tiers responsive to currency.

59. The apparatus of claim 52, wherein the computer system includes multiple computers, and the steps further include servicing any financial instrument in any of the plurality of tiers.

60. The apparatus of claim 52, wherein the step of specifying includes specifying a claim priority on the cash flow for any of the tiers.

61. The apparatus of claim 52, wherein the step of specifying includes specifying a maturity schedule for any of the tiers.

62. The apparatus of claim 52, wherein the step of determining includes determining that the cash flow of the first of the tiers is not less than the cash flow of the second of the tiers.

63. The apparatus of claim 52, further including associating a maturity of any of said constant dollar instruments in any of the tiers with a maturity of any other of said constant dollar instruments in any other of the tiers.

64. The apparatus of any one of claims 52-63, wherein the steps of specifying and of producing documentation of said constant dollar instruments respectively in the tiers are carried out by different computers in the system.

65. The apparatus of claim 64, wherein said steps further include the step of converting any of said constant dollar instruments into an equivalent nominal dollar instrument.

66. The apparatus of claim 52, wherein the step of determining includes using any of the tiers to securitize any other of the tiers.

67. The apparatus of claim 52, wherein the computer system comprises a financial intermediary computer using said tiers in transforming liability of a user of funds into an asset of a supplier of funds.

68. The apparatus of claim 52, wherein the computer system comprises a depository institution computer using said tiers in transforming liability of a user of funds into an asset of a supplier of funds.

69. The apparatus of claim 52, wherein the computer system comprises a commercial bank computer using said tiers in transforming liability of a user of funds into an asset of a supplier of funds.

70. The apparatus of claim 52, wherein the computer system comprises an insurance company computer using said tiers in transforming liability of a user of funds into an asset of a supplier of funds.

71. The apparatus of claim 52, wherein the computer system comprises a pension fund computer using said tiers in transforming liability of a user of funds into an asset of a supplier of funds.

72. The apparatus of claim 52, wherein the computer system comprises a credit union computer using said tiers in transforming liability of a user of funds into an asset of a supplier of funds.

73. The apparatus of claim 52, wherein the computer system comprises a finance company computer using said tiers in transforming liability of a user of funds into an asset of a supplier of funds.

74. The apparatus of claim 52, wherein the computer system comprises a leasing company computer using said tiers in transforming liability of a user of funds into an asset of a supplier of funds.

75. The apparatus of claim 52, wherein the computer system comprises an investment company computer using said tiers in transforming liability of a user of funds into an asset of a supplier of funds.

76. The apparatus of claim 52, wherein the computer system comprises a mutual fund computer using said tiers in transforming liability of a user of funds into an asset of a supplier of funds.

77. The apparatus of claim 52, wherein the computer system comprises a special purpose entity computer using said tiers in transforming liability of a user of funds into an asset of a supplier of funds.

78. The apparatus of claim 52, wherein the computer system comprises a real estate mortgage investment conduit computer using said tiers in transforming liability of a user of funds into an asset of a supplier of funds.

79. The apparatus of claim 52, wherein the computer system comprises a trust computer using said tiers in transforming liability of a user of funds into an asset of a supplier of funds.

80. The apparatus of claim 52, wherein the computer system comprises a limited liability company computer using said tiers in transforming liability of a user of funds into an asset of a supplier of funds.

81. The apparatus of claim 52, wherein the computer system comprises a partnership computer using said tiers in transforming liability of a user of funds into an asset of a supplier of funds.

82. The apparatus of claim 52, wherein the computer system comprises a corporation computer using said tiers in transforming liability of a user of funds into an asset of a supplier of funds.

83. The apparatus of claim 52, wherein the computer system comprises a real estate investment trust computer using said tiers in transforming liability of a user of funds into an asset of a supplier of funds.

84. The apparatus of claim 52, wherein the step of specifying is carried out with the one of said constant dollar instruments comprising a constant dollar mortgage.

85. The apparatus of claim 52, wherein the step of specifying is carried out with the one of said constant dollar instruments comprising a constant dollar mortgage-backed security.

86. The apparatus of claim 52, wherein the step of specifying is carried out with the one of said constant dollar instruments comprising a constant dollar lease.

87. The apparatus of claim 52, wherein the step of specifying is carried out with the one of said constant dollar instruments comprising a constant dollar loan.

88. The apparatus of claim 52, wherein the step of specifying is carried out with the one of said constant dollar instruments comprising a constant dollar security.

89. The apparatus of claim 52, wherein the step of specifying is carried out with the one of said constant dollar instruments comprising a constant dollar asset-backed security.

90. The apparatus of claim 52, wherein the step of specifying is carried out with any of the tiers including undivided interests in any other of the tiers.

91. The apparatus of claim 52, wherein the step of specifying is carried out with said constant dollar instruments comprised of more than one of the group including a constant dollar mortgage-backed security, a constant dollar lease, a constant dollar loan, a constant dollar security, an undivided interests in the second of the tiers, and a constant dollar asset-backed security.

92. The apparatus of claim 52, wherein the step of determining includes evaluating market data including a real interest rate.

93. The apparatus of claim 52, wherein said steps further include the step of computing to reflect aggregation of cash flows of the first of the tiers producing homogeneous securities for an other of the tiers.

94. The apparatus of claim 93, wherein said steps further include the step of computing to reflect disaggregation of the homogeneous securities including splitting of the securities by claim priority.

95. The apparatus of claim 93, wherein said steps further include the step of computing to reflect disaggregation of the homogeneous securities including splitting of the securities by a maturity time.

96. The apparatus of claim 52, wherein said steps further include the step of computing to reflect servicing of any of said constant dollar instruments.

97. The apparatus of claim 52, wherein said private constant dollar instrument is in both said tiers.

98. A machine comprising:
   means for specifying a private constant dollar instrument in at least one of a plurality of tiers
   means for determining funding for one of the tiers to fund an other of the tiers;
   means for associating the tiers in implementing the funding; and
   a printer converting signals from at least one of said means in generating documentation of the funding.

99. The machine of claim 98, wherein the private constant dollar instrument is in the first of the tiers.

100. The machine of claim 98, wherein the private constant dollar instrument is in the second of the tiers.

101. The machine of claim 100, wherein at least one said private constant dollar instrument is in both said tiers.

* * * * *